(12) United States Patent
Ishikawa

(10) Patent No.: US 11,995,416 B2
(45) Date of Patent: May 28, 2024

(54) TRANSLATION DEVICE

(71) Applicant: Panasonic Intellectual Property Management Co., Ltd., Osaka (JP)

(72) Inventor: Tomokazu Ishikawa, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 363 days.

(21) Appl. No.: 17/540,581

(22) Filed: Dec. 2, 2021

(65) Prior Publication Data
US 2022/0092277 A1 Mar. 24, 2022

Related U.S. Application Data

(63) Continuation of application No. PCT/JP2020/017824, filed on Apr. 24, 2020.

(30) Foreign Application Priority Data

Jun. 4, 2019 (JP) .................................. 2019-104680

(51) Int. Cl.
*G06F 17/00* (2019.01)
*G06F 40/268* (2020.01)
(Continued)

(52) U.S. Cl.
CPC ............ *G06F 40/58* (2020.01); *G06F 40/268* (2020.01); *G06F 40/51* (2020.01); *G10L 13/08* (2013.01)

(58) Field of Classification Search
CPC ........ G06F 40/58; G06F 40/268; G06F 40/51; G10L 13/08
(Continued)

(56) References Cited

U.S. PATENT DOCUMENTS

2014/0100843 A1* 4/2014 Tanaka .................... G06F 40/51
704/2
2018/0089169 A1* 3/2018 Yamauchi ............. G06F 40/151
(Continued)

FOREIGN PATENT DOCUMENTS

JP 4929632 5/2012
JP 2017-151553 8/2017
(Continued)

OTHER PUBLICATIONS

International Search Report dated Jul. 14, 2020 in International Application No. PCT/JP2020/017824.
(Continued)

*Primary Examiner* — Paul C McCord
(74) *Attorney, Agent, or Firm* — Wenderoth, Lind & Ponack, L.L.P.

(57) ABSTRACT

A translation device comprises: a memory that stores first dictionary information including a replacement target term in a first language and a translated word in a second language for the replacement target term in association with each other, and second dictionary information including an alternative term instead of the replacement target term; a controller that replaces the replacement target term included in an input sentence with the alternative term to generate a replaced sentence; and a communication interface that outputs the replaced sentence to an external device and acquires a translation result of the replaced sentence in the second language from the external device. The controller detects a specific character string in the translation result of the replaced sentence acquired from the communication interface, and replaces the detected character string with a translated word associated with the replacement target term in the first dictionary information, to generate a translated sentence.

12 Claims, 13 Drawing Sheets

(51) Int. Cl.
  *G06F 40/51*  (2020.01)
  *G06F 40/58*  (2020.01)
  *G10L 13/08*  (2013.01)

(58) Field of Classification Search
  USPC .............................................. 704/2
  See application file for complete search history.

(56) References Cited

U.S. PATENT DOCUMENTS

| | | | |
|---|---|---|---|
| 2019/0251174 A1* | 8/2019 | Lee | G06F 40/51 |
| 2020/0043493 A1* | 2/2020 | Ishikawa | G06F 40/42 |
| 2020/0143793 A1* | 5/2020 | Saeki | G06F 16/3334 |

FOREIGN PATENT DOCUMENTS

| | | |
|---|---|---|
| WO | 2018/198806 | 11/2018 |
| WO | 2019/016985 | 1/2019 |

OTHER PUBLICATIONS

English Translation of the International Preliminary Report on Patentability issued Dec. 16, 2021 in International Application No. PCT/JP2020/017824.

* cited by examiner

32

| ALTERNATIVE WORD DICTIONARY ||
| CLASS | ALTERNATIVE CHARACTER STRING |
| PLACE NAME | +LDMVA+ |
|  | +LDMVB+ |
|  | +LDMVC+ |
| FOOD |  |
|  |  |
|  |  |
| ⋮ | ⋮ |

W1
+LDMVA+
m0  w10  m1

| REPLACEMENT INFORMATION ||
|---|---|
| BEFORE REPLACEMENT (REGISTERED TERM) | AFTER REPLACEMENT (ALTERNATIVE TERM) |
| 手荷物カウンター  J11 | +LDMVA+  W1 |

*Fig. 10*

ALTERNATIVE WORD DICTIONARY 32A

| CLASS | PRIORITY | JAPANESE | ENGLISH |
|---|---|---|---|
| PLACE NAME | 1 | 霧島七不思議 (J23) | Kirishima 7 wonders (E23) |
| | 2 | あさぎりの湯 | Spa of Asagiri |
| | 3 | 東京駅 | Tokyo Station |
| FOOD | 1 | | |
| | 2 | | |
| | 3 | | |
| ⋮ | ⋮ | ⋮ | ⋮ |

| REPLACEMENT INFORMATION ||
|---|---|
| BEFORE REPLACEMENT (REGISTERED TERM) | AFTER REPLACEMENT (ALTERNATIVE TERM) |
| 手荷物カウンター (J11) | 霧島七不思議 (J23) |

ALTERNATIVE WORD DICTIONARY

| CLASS | PRIORITY | JAPANESE | ENGLISH |
|---|---|---|---|
| PLACE NAME | 1 | +LDMVA+ (W1) | +LDMVA+ (W1) |
| | 2 | 霧島七不思議 | Kirishima 7 wonders |
| | 3 | 東京駅 | Tokyo Station |
| FOOD | 1 | | |
| | 2 | | |
| | 3 | | |
| ⋮ | ⋮ | ⋮ | ⋮ |

TRANSLATION DEVICE

BACKGROUND

1. Technical Field

The present disclosure relates to a translation device that translates a sentence input in one language into another language.

2. Related Art

Japanese Patent No, 4929632 discloses an electronic dictionary device that translates an English text input by a user into a Japanese text. When a registered word registered in advance is included in the input English text, the electronic dictionary device replaces a translated word corresponding to the registered word with English in the Japanese text that is a translation result and displays the translated word. That is, the registered word is displayed in an English state, and portions other than the registered word are displayed in a state of being translated into Japanese. For example, in a case where "cheap" is registered as the registered word, "Kore ha cheap kaban desu." is output as a translation result of "This is a cheap bag". Further, the electronic dictionary device disclosed in Japanese Patent No. 4929632 displays registered words in English and Japanese texts and their translated words with underlines in response to pressing of a translation/determination key. As a result, the user can perform language learning for the registered word.

SUMMARY

The present disclosure provides a translation device capable of facilitating to obtaining a translated sentence indicating a translation result of an input sentence by using machine translation from a first language to a second language.

A translation device according to one aspect of the present disclosure acquires an input sentence in a first language, communicates with an external device that executes machine translation from the first language to a second language, and outputs a translated sentence indicating a translation result of the input sentence. The translation device includes a memory, a controller, and a communication interface. The memory stores first dictionary information including a replacement target term in the first language and a translated word in the second language for the replacement target term in association with each other, and second dictionary information including a plurality of alternative terms which are character strings different from each other and each used instead of the replacement target term. The controller replaces the replacement target term included in the input sentence with the alternative term, to generate a replaced sentence indicating a replacement result. The communication interface outputs the replaced sentence to the external device, and acquires a translation result of the replaced sentence in the second language from the external device. An alternative term in the plurality of alternative terms consists of a specific character string. The controller detects the specific character string in the translation result of the replaced sentence acquired from the communication interface, replaces the detected character string with a translated word associated with the replacement target term in the first dictionary information, and generates a translated sentence.

A translation device according to another aspect of the present disclosure acquires an input sentence in a first language, communicates with an external device that executes machine translation from the first language to a second language, and outputs a translated sentence indicating a translation result of the input sentence. The translation device includes a memory, a controller, and a communication interface. The memory stores first dictionary information including a replacement target term in the first language and a translated word in the second language for the replacement target term in association with each other, and second dictionary information including a plurality of alternative terms each used instead of the replacement target term in the first language and translated words in the second language for the alternative terms in association with each other. The controller replaces the replacement target term included in the input sentence with the alternative term, to generate a replaced sentence indicating a replacement result. The communication interface outputs the replaced sentence to the external device, and acquires a translation result of the replaced sentence in the second language from the external device. The controller determines whether or not a translated word of an alternative term is present in the translation result of the replaced sentence acquired from the communication interface. When the controller determines that the translated word of the alternative term is not present, the controller renews a replaced sentence using an alternative term different from the alternative term associated with the translated word in the second dictionary information, and causes the communication interface to output the renewed replaced sentence. When the controller determines that the translated word of the alternative term is present, the controller replaces the translated word with a translated word associated with the replacement target term in the first dictionary information to generate a translated sentence.

These general and specific aspects may be realized by a system, a method, a computer program, and a combination thereof.

According to a translation device according to the present disclosure, it is possible to facilitate to obtain a translated sentence indicating a translation result of an input sentence by using machine translation from a first language to a second language.

BRIEF DESCRIPTION OF THE DRAWINGS

FIG. 6 is a diagram illustrating an example of replacement information according to the first embodiment;

FIG. 10 is a diagram illustrating an example of an alternative word dictionary according to a second embodiment;

FIG. 12 is a diagram illustrating an example of replacement information according to the second embodiment; and FIG. 13 is a diagram illustrating a modification of the alternative word dictionary according to the second embodiment.

DESCRIPTION OF EMBODIMENTS

Hereinafter, embodiments of the present disclosure will be described in detail with reference to the drawings as appropriate. However, unnecessarily detailed description may be omitted. For example, detailed description of a well-known matter and repeated description of substantially the same configuration may be omitted. This is to avoid unnecessary redundancy of the following description and to facilitate understanding of the persons skilled in the art.

Note that the inventors provide the accompanying drawings and the following description in order to allow the persons skilled in the art to fully understand the present disclosure, and do not intend to limit the subject matter described in the claims by the accompanying drawings and the following description.

Finding to Present Disclosure

Prior to describing the embodiments of the present disclosure, at first, finding to present disclosure by the inventor of the present application will be described using FIG. 1.

Figure 1:
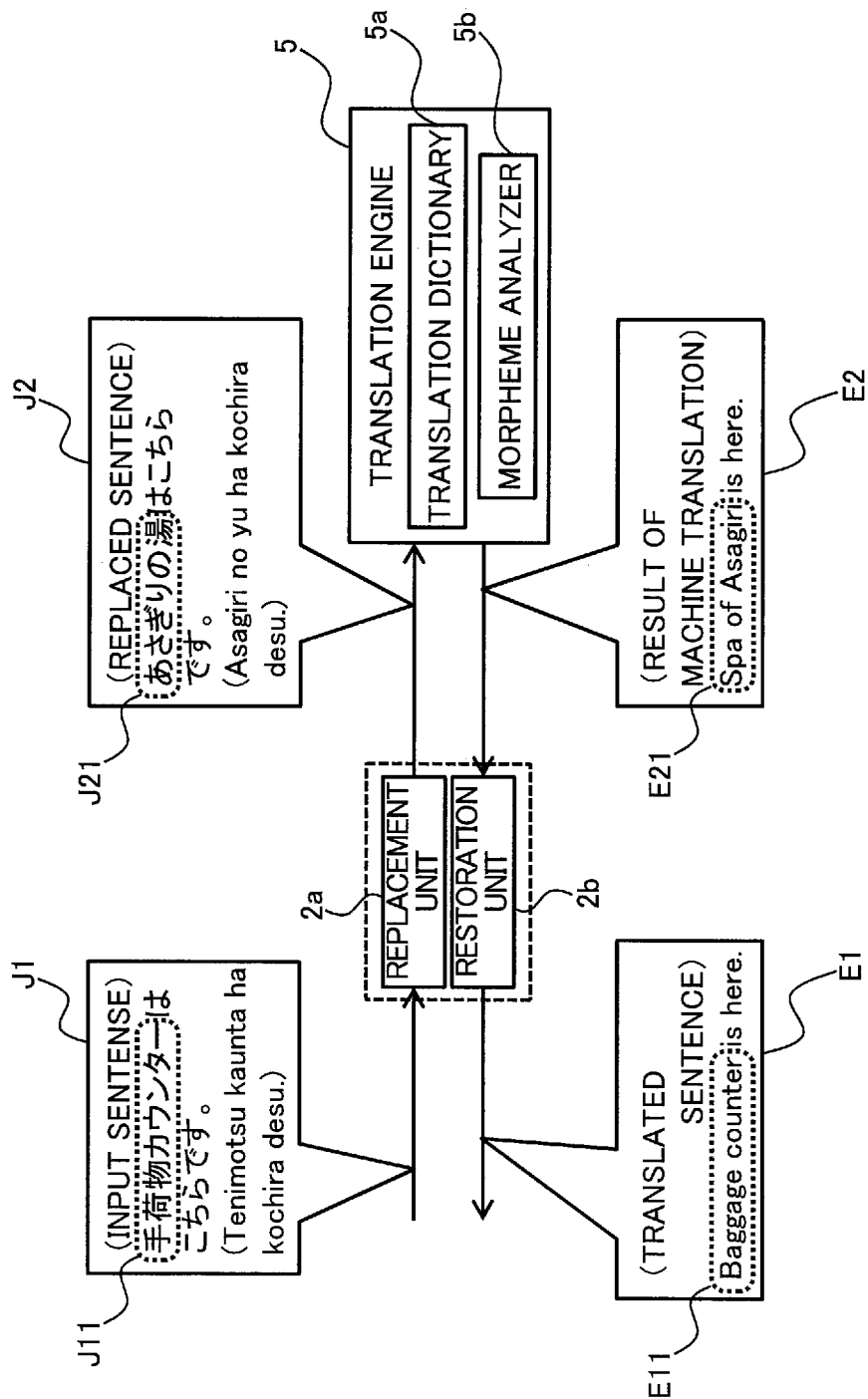
FIG. 1 is a diagram illustrating a translation engine and vocabulary replacement/restoration processing according to the present disclosure.

FIG. 1 is a diagram illustrating a translation engine 5 and vocabulary replacement/restoration processing according to the present disclosure. The translation engine 5 includes a translation dictionary 5a that manages parallel translation of terms in various languages, a morpheme analyzer 5b that analyzes morphemes in sentences, and the like, to execute machine translation from various first languages to various second languages. The vocabulary replacement/restoration processing is translation processing of applying vocabulary replacement/restoration technology to a specific vocabulary to generate a translated sentence. For the translation engine 5, it is presumed that there may be an unknown word that is a term not registered in the translation dictionary 5a or the like. The vocabulary replacement/restoration processing applicable in such a case will be described below using an example in which the first language is Japanese and the second language is English.

FIG. 1 illustrates a case where an input sentence that is to be translated is a sentence J1 "Tenimotsu kaunta ha kochira desu." in Japanese, and a term J11 "Tenimotsu kaunta" included in the sentence J1 of the input sentence is an unknown word. As an example of the unknown word, a term that is a technical term used only in a scene related to a specific job category and is not common is presumed.

The vocabulary replacement/restoration processing is realized by a replacement unit 2a that performs pre-processing of machine translation by the translation engine 5 and a restoration unit 2b that performs post-processing, for example. For example, the replacement unit 2a sets, as a replacement target, the term J11 to be the unknown word in the sentence J1 of the input sentence, and replaces the term J11 with a term used instead of the unknown word, that is, an alternative term.

As an example of the alternative term, a term that is considered to be more general than the unknown word but is considered to be hardly included in sentences presumed as various input sentences can be used. According to this, it is expected that confusion with the term included in the input sentence is avoided, and erroneous translation is less likely to occur. In the present example, a term J21 "Asagiri no yu" in Japanese is used as the alternative term. The replacement unit 2a outputs, to the translation engine 5, a sentence J2 "Asagiri no yu ha kochira desu." including the term J21 as a replaced sentence of a replacement result.

In the example of FIG. 1, the translation engine 5 executes machine translation processing for the sentence J2, and outputs "Spa of Asagiri is here." as a sentence E2 of a processing result. The sentence E2 includes "Spa of Asagiri" as a translated word E21 of the term J21 instead of the unknown word. The restoration unit 2b performs processing for restoring the unknown word in a translated sentence presented as a translation result of the input sentence from the result of the machine translation of the replaced sentence such as the sentence E2.

FIG. 1 illustrates a case where the processing of the restoration unit 2b is successful. The restoration unit 2b processes the sentence E2 and outputs a sentence E1 "Baggage counter is here." as a translated sentence for the sentence J1 of the input sentence. In the sentence E1, the translated word E21 of the alternative term in the sentence E2 is replaced with "Baggage counter" to be a translated word E11 of the term J11 set as the replacement target by the replacement unit 2a as the term J11 is the unknown word in the input sentence.

As in the present example, if the restoration unit 2b can re-replace the translated word E21 of the alternative term with an unknown word such as the translated word E11 in the sentence E2 as the machine translation result of the replaced sentence, a translated sentence with the unknown word appropriately restored can be obtained. At this time, the translated word E11 after restoration of the unknown word can be set in advance on the restoration unit 2b and the replacement unit 2a in association with the term J11 of the replacement target independently of the processing of the translation engine 5.

However, a case where the translated word E21 of the alternative term varies depending on internal processing of the translation engine 5, and is different from a translated word preset on the restoration unit 2b is anticipated. Further, a case is anticipated where the morpheme analyzer 5b cannot properly recognize the morpheme of the alternative term at the time of processing in the translation engine 5, so that a problem occurs in the machine translation result. From these various viewpoints, the inventor has intensively studied to find a problem that, in the translation processing using the conventional vocabulary replacement/restoration technology, it is difficult to avoid a situation where restoration of an unknown word fails, and it is difficult to obtain a translated sentence with high accuracy so as to indicate a translation result of an input sentence.

Therefore, the inventor has more intensively studied the above problems, to devise a translation device that can facilitate to obtain a translated sentence indicating a translation result of an input sentence including an unknown word of the translation engine 5 by improving the vocabulary replacement/restoration processing and the alternative term. Hereinafter, embodiments of a translation device according to the present disclosure will be described.

First Embodiment

Hereinafter, a first embodiment will be described using the drawings. In the first embodiment, a translation device that uses, as an alternative term, a specific character string that is not translated by a translation engine 5 will be described.

1. Configuration

Figure 2:
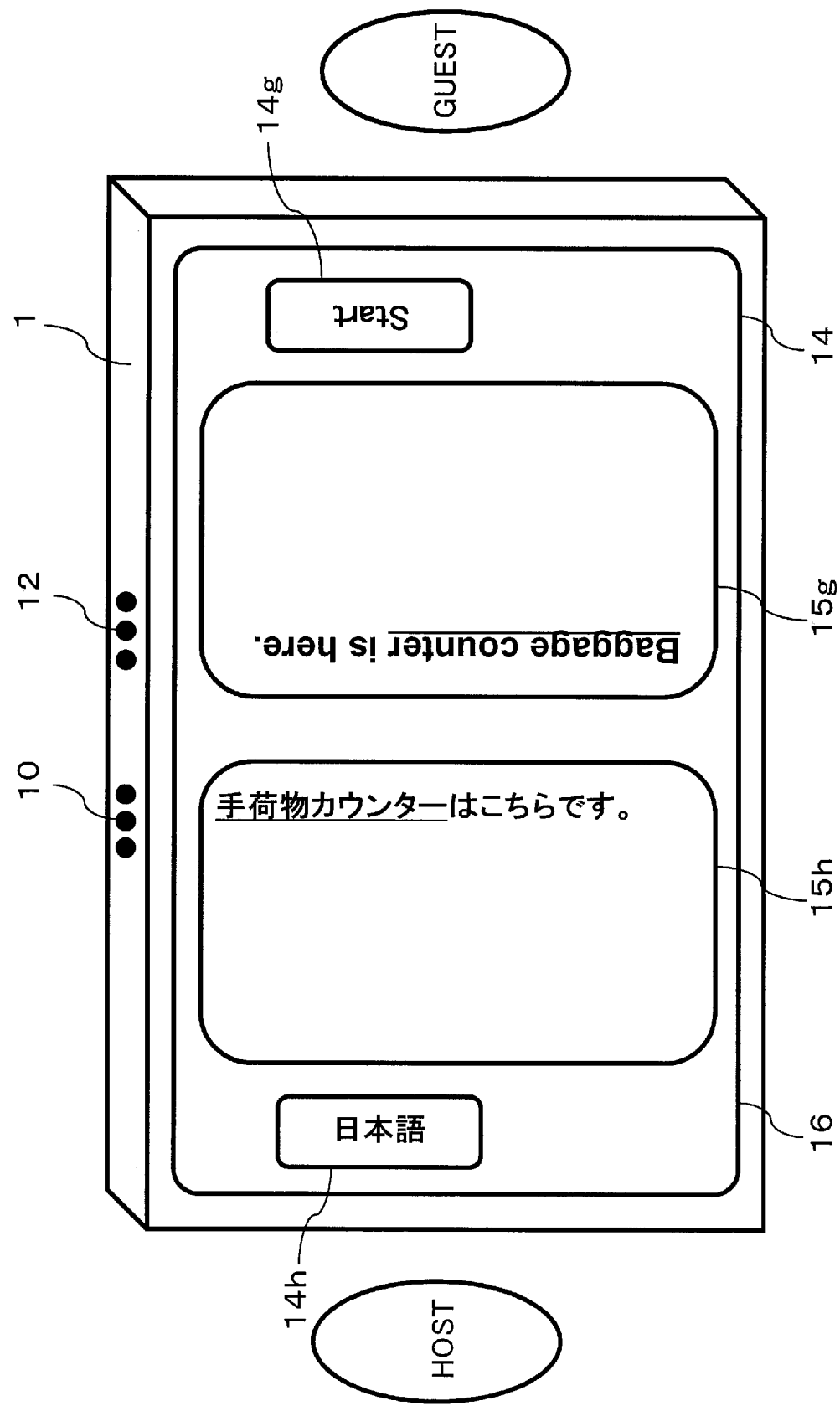
FIG. 2 is a diagram illustrating an external appearance of a translation device according to a first embodiment of the present disclosure.

FIG. 2 is a diagram illustrating an external appearance of a translation device 1 according to the first embodiment. The translation device 1 illustrated in FIG. 2 is, for example, a tablet-type translation device, and translates conversations of two users in different languages. Hereinafter, in the present embodiment, a description will be given assuming that the translation device 1 translates a face-to-face conversation between a host (e.g., a guide) speaking Japanese and a guest (e.g., a traveler) speaking English.

The translation device 1 includes a microphone 10, a speaker 12, a display 14, and a touch panel 16. For example, the microphone 10 and the speaker 12 are disposed in the vicinity of an opening on a side surface of the translation device 1. The display 14 and the touch panel 16 are disposed on a principal surface of the translation device 1. In a region on one side (e.g., the host side) in a longitudinal direction of the display 14, an utterance icon 14h and a display region 15h are disposed. In a region on the other side in the longitudinal direction of the display (e.g., the guest side), an utterance icon 14g and a display region 15g are displayed. The users perform a touch operation on the utterance icons 14h and 14g.

The utterance icon 14h is an operation icon for allowing the host to designate start and end time points of an utterance of the host when the host speaks, that is, when the host inputs, to the translation device 1, the utterance in Japanese as a translation source. The utterance icon 14g is an operation icon for allowing the guest to designate start and end time points of an utterance of the guest when the guest speaks, that is, when the guest inputs the utterance in English as a translation source. The display regions 15h and 15g are regions for displaying a voice recognition result, a translation result, and the like as character strings.

Figure 3:
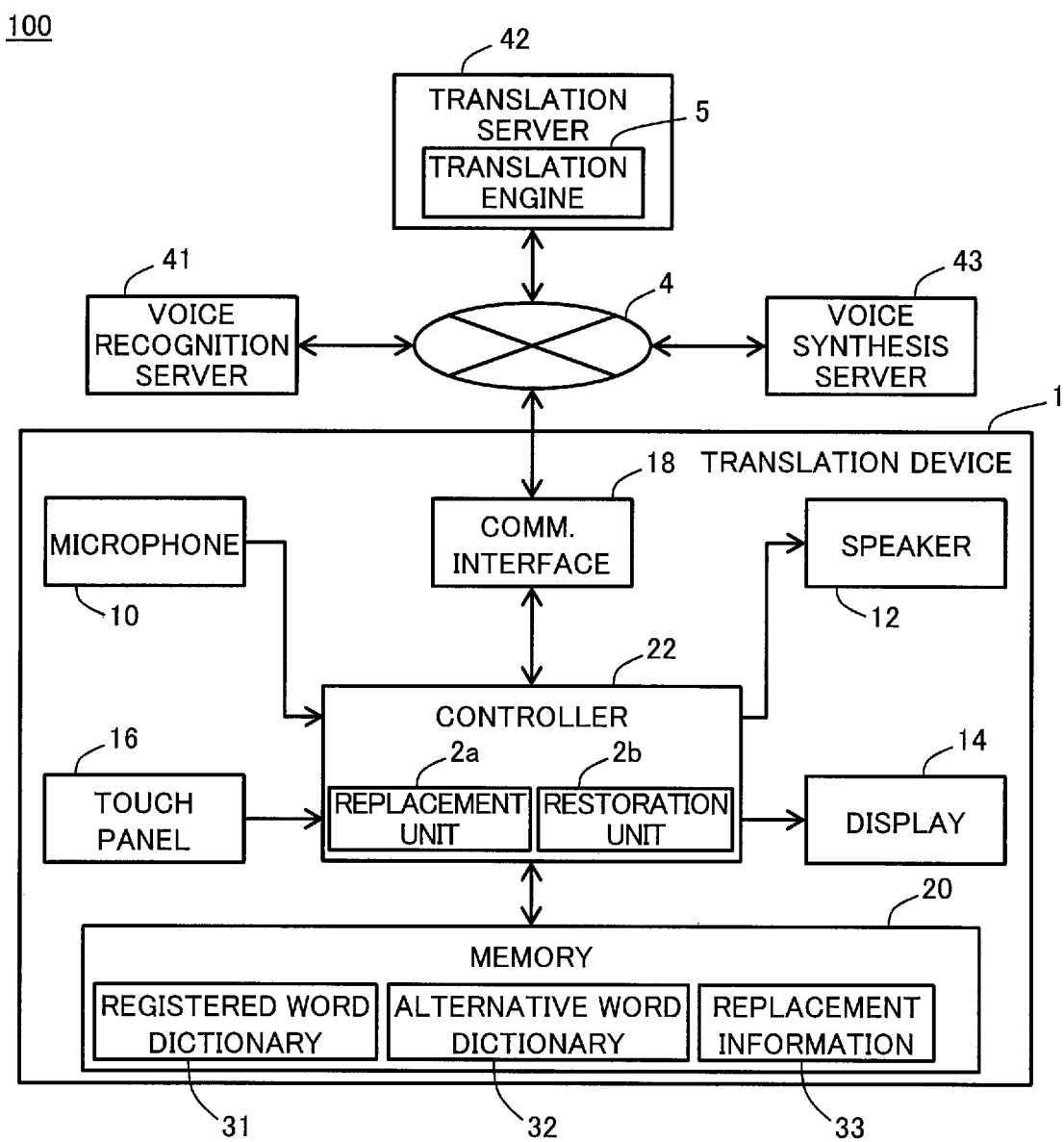
FIG. 3 is a block diagram illustrating a configuration of a translation system according to the first embodiment.

FIG. 3 is a block diagram illustrating a configuration of a translation system 100 according to the first embodiment. The translation system 100 has the translation device 1 illustrated in FIG. 2, a voice recognition server 41, a translation server 42, and a voice synthesis server 43. The translation device 1 performs data communication with each of the voice recognition server 41, the translation server 42, and the voice synthesis server 43 via a communication network 4 such as the Internet.

The voice recognition server 41 is a server that receives voice data from the translation device 1 via the communication network 4, performs voice recognition on the received voice data, and generates voice recognition data including a character string of a recognition result, that is, text data of an uttered sentence. Note that the voice recognition server 41 is an example of a voice recognition device outside the translation device 1 in the present embodiment.

The translation server 42 is a server on which the translation engine 5 is installed. The translation server 42 receives the voice recognition data from the translation device 1 via the communication network 4, executes machine translation by the translation engine 5 on the received voice recognition data, and generates translation data to be text data indicating a result of the machine translation. The translation server 42 is an example of an external device having a function of translating a first language into a second language.

The voice synthesis server 43 is a server that receives the translation data from the translation device 1 via the communication network 4, and performs voice synthesis on the received translation data to generate a voice signal.

The translation device 1 includes a communication interface 18, a memory 20, and a controller 22 in addition to the microphone 10, the speaker 12, the display 14, and the touch panel 16.

The microphone 10 is a device that converts a physical voice into voice data. Specifically, the microphone 10 converts a voice input from the outside into a voice signal of an analog electric signal, and further converts the voice signal into digital voice data by an AD converter. The microphone 10 is an example of a voice input interface that inputs a voice such as an utterance.

The communication interface 18 is a communication module that performs data communication with the voice recognition server 41, the translation server 42, and the voice synthesis server 43 via the communication network 4 in accordance with a communication system such as Bluetooth (registered trademark), Wi-Fi (registered trademark), 3G, LTE (registered trademark), or IEEE802.11.

The memory 20 is a recording medium including a flash memory, a ferroelectric memory, an HDD, an SSD, a RAM, a combination thereof, and the like. The memory 20 stores voice data of the microphone 10, voice recognition data, and translation data. Further, the memory 20 stores various programs for the controller 22.

In the present embodiment, the memory 20 stores a registered word dictionary 31, an alternative word dictionary 32, and replacement information 33. The registered word dictionary 31 is an example of dictionary information for registering a specific term of the replacement target in the vocabulary replacement/restoration processing. The alternative word dictionary 32 is an example of dictionary information including an alternative term used instead of the replacement target at the time of translation. The replacement information 33 is information indicating association between a term before replacement and a term after the replacement. The data structures of the registered word dictionary 31, the alternative word dictionary 32, and the replacement information 33 will be described later.

The controller 22 includes a CPU, an MPU, and the like, and executes various programs stored in the memory 20 to control the overall operation of the translation device 1. For example, the controller 22 includes a replacement unit 2a and a restoration unit 2b as functional configurations. In the present embodiment, the function of the controller 22 is realized by cooperation of hardware and software, but may be realized only by a hardware circuit exclusively designed to realize a predetermined function. That is, the controller 22 can include not only a CPU and an MPU but also a DSP, an FPGA, an ASIC, and the like.

The speaker 12 is a device that converts an electric signal into a voice. The speaker 12 outputs a voice based on the voice signal (electric signal) from the controller 22. The speaker 12 is an example of an output interface that outputs a voice such as a translation result to the outside.

The display 14 is a device that displays an image, and includes a liquid crystal display device or an organic EL display device. The display 14 displays images indicated by voice recognition data, translation data, and reverse translation data from the controller 22 in the display regions 15h and 15g. The display 14 is an example of an output interface that displays and outputs the voice recognition data, the translation data, and the like to the host and the guest. Further, the display 14 displays the utterance icons 14h and 14g described above.

The touch panel 16 is an operation interface operated by the user, and receives an instruction from the user. The touch panel 16 is disposed to overlap the display 14.

1-1. Data Structure

The data structures of the registered word dictionary 31, the alternative word dictionary 32, and the replacement information 33 stored in the translation device 1 according to the present embodiment will be described with reference to FIGS. 4 to 6.

Figure 4:
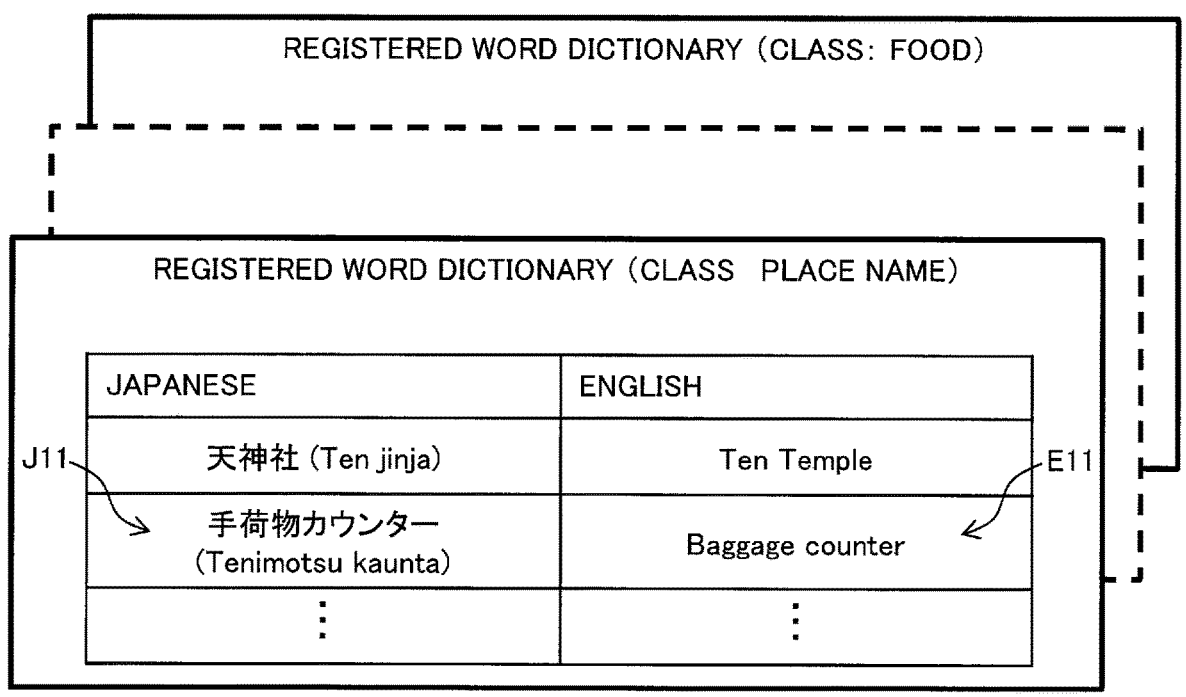
FIG. 4 is a diagram illustrating an example of a registered word dictionary according to the first embodiment.

FIG. 4 illustrates an example of the registered word dictionary 31. In the registered word dictionary 31, a specific term of the replacement target in the vocabulary replacement/restoration processing is registered. In the present embodiment, it is assumed that terms registered in the registered word dictionary 31 of the translation device 1 are unknown words for the translation engine 5. Such replacement target terms include various proper nouns, for example.

The terms included in the registered word dictionary 31 include words and phrases. The registered word dictionary 31 includes terms described in parallel in a plurality of languages. FIG. 4 illustrates an example in which the plurality of languages are Japanese and English, but the present disclosure is not particularly limited thereto, and various natural languages can be adopted. Hereinafter, among terms described in parallel in the plurality of languages in the registered word dictionary 31, a term described in a source language for translation is referred to as a "registered term", and a term described in a target language for translation is referred to as a "translated word of the registered term".

The registered word dictionary 31 is provided for each class indicating the type of registered term, for example. The class is intended to classify a term, and is a category of a target indicated by the term. For example, the class includes a place name and food. The registered word dictionary 31 may include additional information in association with the registered term. For example, in a case where the class is the "place name", the additional information is information indicating a picture of a place indicated by the registered term or an access mechanism.

The term registered in the registered word dictionary 31 is not necessarily an unknown word, and may be, for example, a term that is presumed to be difficult to be translated as desired by machine translation using the translation engine 5. Further, a technical term used only in a specific field or a term used only in a part of places or regions may be registered in the registered word dictionary 31 without particularly considering the presence or absence of registration in the translation engine 5. As a result, it is possible to translate the translated word of the registered term according to the parallel translation in the registered word dictionary 31 in the translated sentence through the vocabulary replacement/restoration processing.

Figure 5:
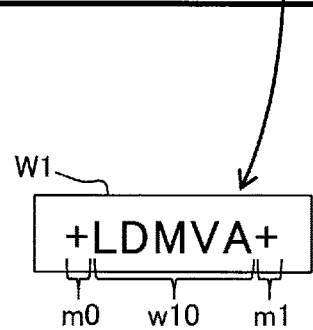
FIG. 5 is a diagram illustrating an example of an alternative word dictionary according to the first embodiment.

FIG. 5 illustrates an example of the alternative word dictionary 32 according to the present embodiment. The alternative word dictionary 32 includes alternative terms used in place of registered terms at the time of translation. As illustrated in FIG. 5, the alternative word dictionary 32 according to the present embodiment manages alternative character strings that are alternative terms including special character strings for each class, for example.

In the present embodiment, the alternative character string includes a head symbol m0, a tail symbol m1, and a character portion w10 arranged between the head and tail symbols m0 and m1, for example, like a character string W1 illustrated in FIG. 5.

The head and tail symbols m0 and m1 in the alternative character string are each set to a predefined symbol such as "+", for example. For example, according to the symbols m0 and m1 of "+", it is possible to easily distinguish between the inside and the outside of the alternative character string in the morpheme analysis or the like of a sentence including the alternative character string. The symbols m0 and m1 are set to, for example, the same symbol, but may not be set to the same symbol. The symbols m0 and m1 may be set to various bracket symbols, for example.

The character portion w10 in the alternative character string is configured by arranging a plurality of characters of the same type as each other, as an example illustrated in the character string W1. For example, the plurality of characters of the character portion w10 are set so as not to make sense, that is, so that the arrangement of the characters does not become a word or the like having a meaning. This makes it easy to prevent the alternative character string from changing before and after the machine translation processing in the translation engine 5. The alternative character string can be set to a specific character string that is presumed not to change before and after the machine translation processing in the translation engine 5.

For example, the character type of the character portion w10 is set to a character type having a relatively low occurrence frequency in the source language for translation. For example, when the translation source is Japanese, the character portion w10 is set to an alphabet, so that the occurrence frequency is reduced as compared with Chinese characters and the like. The alternative word dictionary 32 may manage different alternative character strings for each of various languages, and may associate a language as the translation source with an alternative character string of a character type having a low occurrence frequency in the same language.

FIG. 6 illustrates an example of the replacement information 33. The replacement information 33 is generated upon executing the vocabulary replacement/restoration processing to be described later, and is temporarily stored in the memory 20 during the processing, for example. The replacement information 33 includes a term before the replacement and a term after the replacement in association with each other. The term before the replacement is a registered term of the replacement target in the vocabulary replacement/restoration processing, and the term after the replacement is an alternative term to the registered term of the replacement target.

2. Operation

The operations of the translation system 100 and the translation device 1 configured as described above will be described below.

2-1. Overall Operation

The overall operations of the translation system 100 and the translation device 1 will be described with reference to FIG. 7. In the present embodiment, the translation engine 5 is installed on the translation server 42. The translation device 1 transmits text data of an uttered sentence to the translation server 42, and acquires text data of a translated sentence indicating a translation result from the translation server 42.

Figure 7:
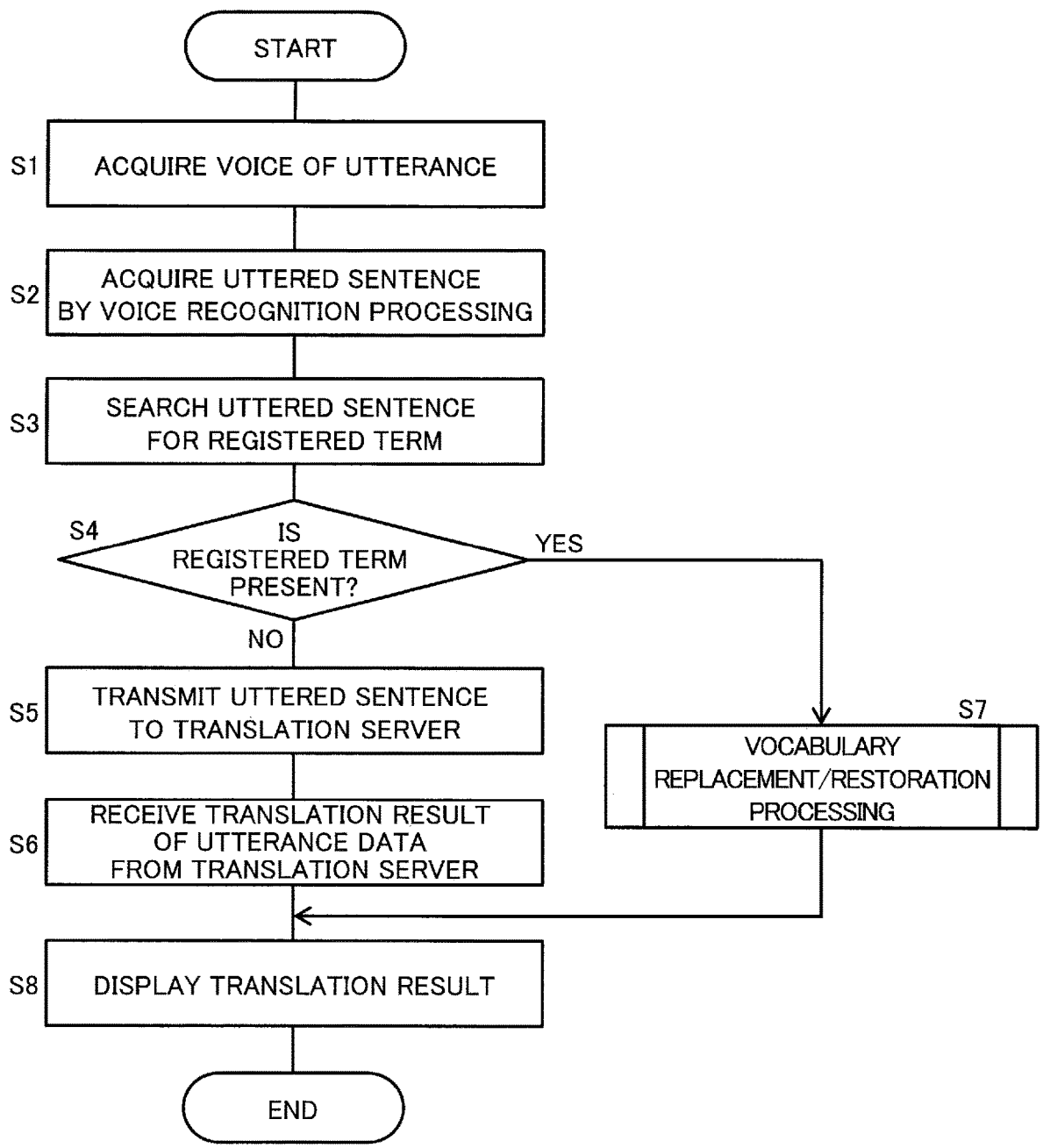
FIG. 7 is a flowchart illustrating an operation of the translation device in the translation system.

FIG. 7 is a flowchart illustrating the operation of the translation device 1 in the translation system 100. Each processing illustrated in the flowchart of FIG. 7 is executed by the controller 22 of the translation device 1.

At first, the controller 22 of the translation device 1 acquires voice data corresponding to a voice of an utterance of a speaking person via the microphone 10 (S1).

The controller 22 acquires an uttered sentence by voice recognition processing (S2). Specifically, the controller 22 first transmits the acquired voice data to the voice recognition server 41 via the communication network 4. The voice recognition server 41 performs voice recognition on the received voice data, and generates text data of the uttered sentence. The translation device 1 receives the text data of the uttered sentence from the voice recognition server 41 via the communication network 4.

Next, the controller 22 searches the acquired uttered sentence for a registered term included in the registered word dictionary 31 (S3). Then, the controller 22 determines whether the registered term is present in the uttered sentence (S4).

When the registered term is not present in the uttered sentence (NO in S4), the controller 22 performs normal translation processing instead of the vocabulary replacement/restoration processing (S5 and S6). The normal translation processing is processing of acquiring a translated sentence of the uttered sentence without using the replacement unit 2a and the restoration unit 2b.

Specifically, the controller 22 of the translation device 1 first transmits the text data of the uttered sentence to the translation server 42 via the communication network 4 (S5). The translation server 42 executes machine translation on the uttered sentence in the translation engine 5 to generate text data as a result of the machine translation. The translation server 42 transmits the generated text data to the translation device 1 via the communication network 4. The translation device 1 receives the text data of the translation result as the translated sentence from the translation server 42 via the communication network 4 (S6).

On the other hand, when the registered term is present in the uttered sentence (YES in S4), the controller performs the vocabulary replacement/restoration processing according to the present embodiment (S7). According to the vocabulary replacement/restoration processing according to the present embodiment, the accuracy of the translated sentence can be improved by using the alternative character string. Details of the vocabulary replacement/restoration processing will be described later.

For example, the controller 22 controls the display 14 so as to display the translation results of steps S6 and S7 (S8). As an example illustrated in FIG. 2, the display 14 displays the uttered sentence in the display region 15h on the host side and displays the translated sentence in the display region 15g on the guest side. Note that the uttered sentence and the translated sentence may be displayed simultaneously or sequentially. For example, the controller 22 may display the uttered sentence prior to receiving the text of the translated sentence from the translation server 42.

The controller 22 of the translation device 1 ends the operation illustrated in the flowchart of FIG. 7 by displaying the translation result (S8), for example.

According to the operations of the translation system 100 and the translation device 1 described above, the translation device 1 can receive input of an uttered sentence to be an example of an input sentence by the utterance, and can present a translated sentence of a translation result of the uttered sentence using the machine translation by the translation engine 5.

Additionally or alternatively to displaying the translated sentence (S8), the translation device 1 may output the translated sentence by voice. In this case, the controller 22 of the translation device 1 transmits the text data of the translated sentence obtained in steps S6 and S7 to the voice synthesis server 43 via the communication network 4. The voice synthesis server 43 performs voice synthesis on the basis of the text data of the translated sentence received from the translation device 1 to generate a voice signal, and transmits the voice signal to the translation device 1 via the communication network 4. The controller 22 outputs a voice indicating the translation result from the speaker 12, on the basis of the voice signal received from the voice synthesis server 43.

2-2. Vocabulary Replacement/Restoration Processing

Details of the vocabulary replacement/restoration processing (S7) according to the present embodiment will be described using FIGS. 8 and 9.

Figure 8:
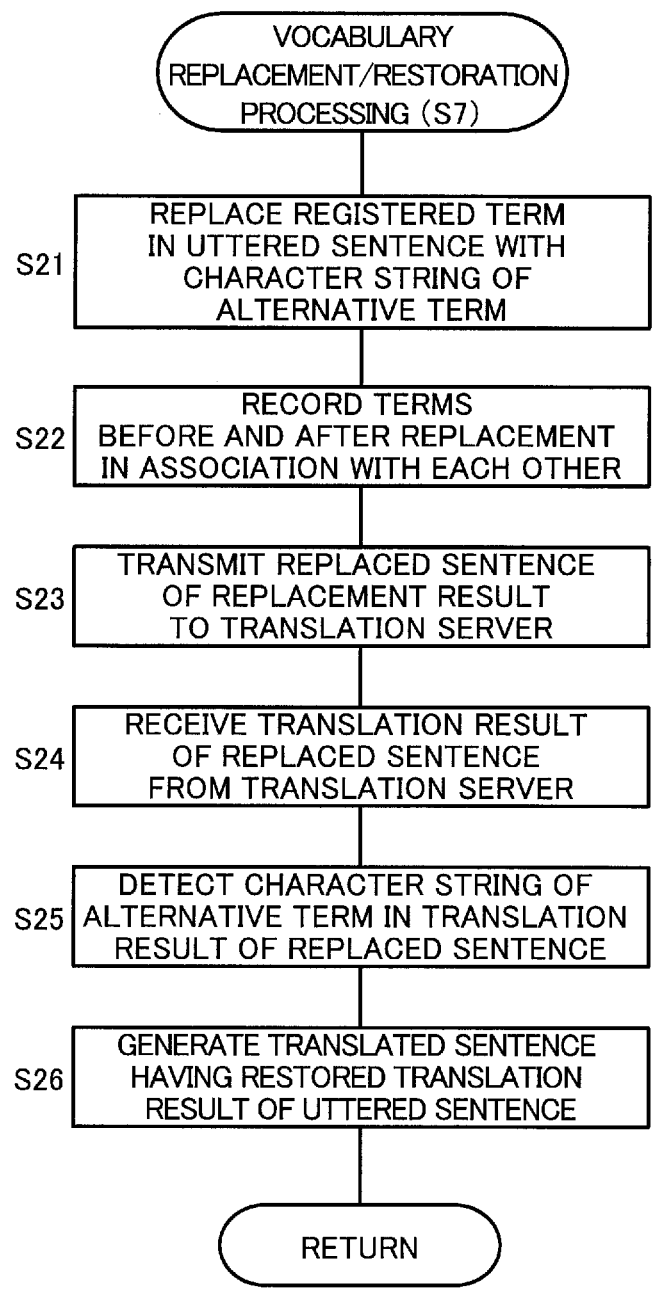
FIG. 8 is a flowchart illustrating vocabulary replacement/restoration processing according to the first embodiment.

FIG. 8 is a flowchart illustrating the vocabulary replacement/restoration processing according to the present embodiment. FIG. 9 is a diagram illustrating the vocabulary replacement/restoration processing according to the present embodiment.

In the following description, the explanation will be given assuming an example of a scene where translation system 100 translates a Japanese utterance uttered by the host into English and transmits a translation result to the guest. Specifically, the example is described where an uttered sentence as an example of an input sentence is a sentence J10 "Tenimotsu kaunta mae ni jihanki ga arimasu." including a Japanese term J11 as an unknown word, as illustrated in FIG. 9. In this example, the controller 22 of the translation device 1 proceeds to YES in step S4 in FIG. 7 on the basis of the term J11 in the uttered sentence, and executes the processing of FIG. 8 in step S7.

At first, the controller 22 of the translation device 1, functioning as the replacement unit 2a, replaces a registered term in an uttered sentence with a specific character string as an alternative term (S21). The controller 22 as the replacement unit 2a refers to the registered word dictionary 31 and the alternative word dictionary 32 in the memory 20 and performs the processing of step S21.

Figure 9:
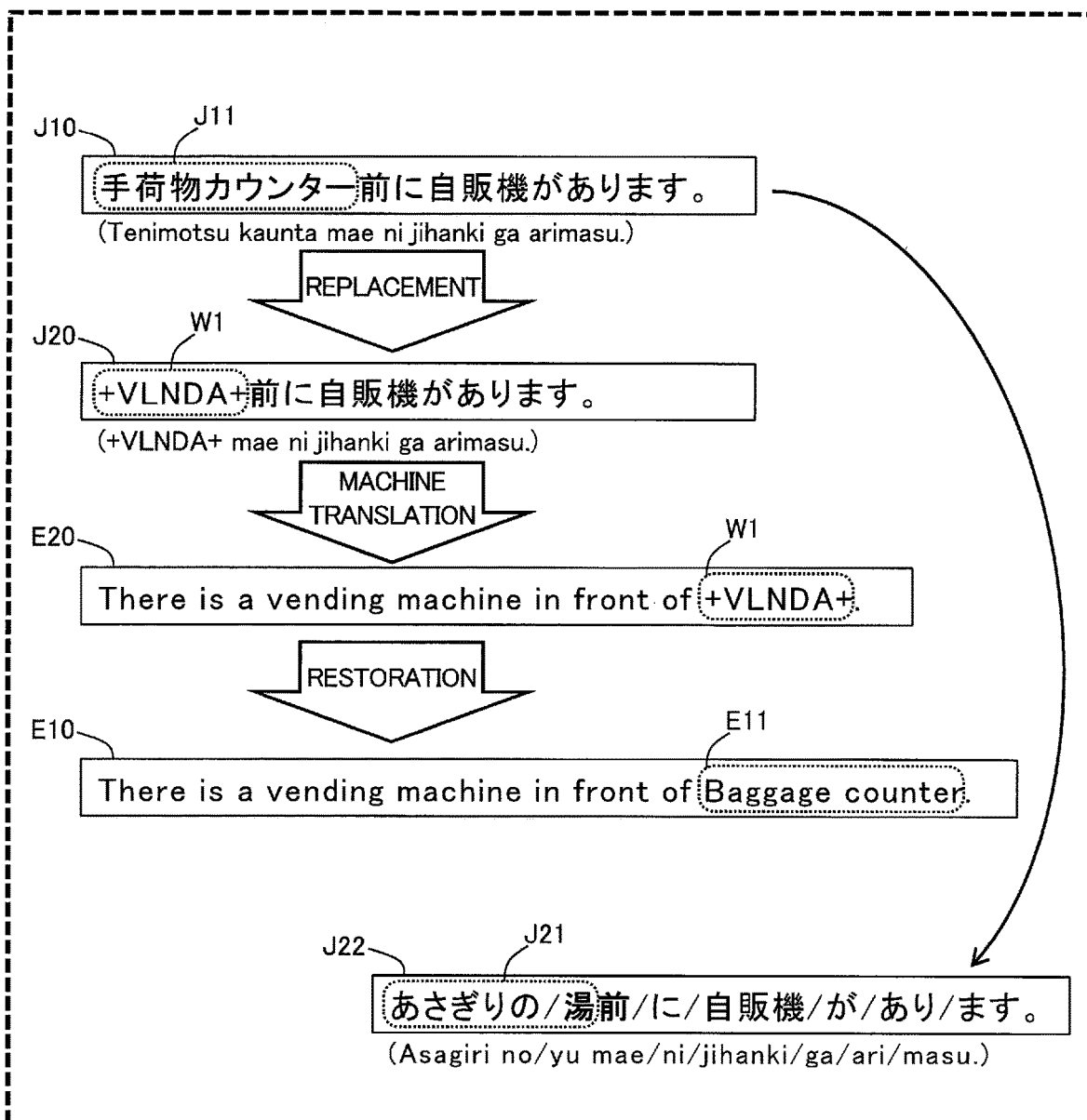
FIG. 9 is a diagram illustrating the vocabulary replacement/restoration processing according to the first embodiment.

As an example illustrated in FIG. 4, the term J11 to be an unknown word in the example of FIG. 9 is registered in the registered word dictionary 31 in advance so as to belong to the class "place name". In step S21, based on the class "place name", the controller 22 selects a character string W1 "+LDMVA+", which is one of the alternative character strings belonging to the class "place name", as an alternative term from the alternative word dictionary 32 illustrated in FIG. 5, for example. Then, the controller 22 replaces the term J11 in the sentence J10 of the input sentence with the selected alternative term, and generates a sentence J20 "+LDMVA+ mae ni jihanki ga arimasu" as a replaced sentence as illustrated in FIG. 9.

The controller 22 records the terms before and after the replacement in association with each other as the replacement information 33 (S22). Exemplary replacement information 33 in the example of FIG. 9 is as illustrated in FIG. 6, with the term J11 of the replacement target being recorded as the term before the replacement, and the character string W1 selected as the alternative term being recorded as the term after the replacement.

The controller 22 transmits a replaced sentence of a replacement result for the uttered sentence to the translation server 42 via the communication interface 18 (S23). In this example, text data indicating the sentence J20 including the character string W1 of the alternative term is transmitted as the replaced sentence.

The translation server 42 executes machine translation processing by the translation engine 5 on the text data of the replaced sentence received therefrom, to generate text data indicating a result of the machine translation. In the example of FIG. 9, a sentence E20 "There is a vending machine in front of +LDMVA+." is generated as a result of the machine translation for the sentence J20 of the replaced sentence. The translation server 42 transmits text data indicating a sentence of a translation result of the replaced sentence to the translation device 1 via the communication network 4. The controller 22 of the translation device 1 receives the translation result of the replaced sentence from the translation server 42 via the communication interface 18 (S24).

Next, the controller 22, functioning as the restoration unit 2b, detects a character string of an alternative term in the received translation result (S25), and generates a translated sentence in which the translation result of the uttered sentence has been restored (S26). In the example of FIG. 9, a sentence E1 such as "Baggage counter is here." as the translated sentence for the sentence J10 is restored from the sentence E20.

Specifically, the controller 22 as the restoration unit 2b first specifies the character string W1 of the alternative term after the replacement from the replacement information 33 illustrated in FIG. 6, and searches, for the character string W1, the sentence E20 that is the translation result of the replaced sentence (S25). Further, the controller 22 specifies that the registered term before the replacement is the term J11 from the replacement information 33. The controller 22 reads "Baggage counter" corresponding to the term J11 from the registered word dictionary 31 as the translated word E11, and replaces "+LDMVA+" in the sentence E20 with a translated word E11. As a result, a translated sentence such as the sentence E20 is generated (S26).

When the translated sentence is generated (S26), the controller 22 ends the processing of step S7 in FIG. 7, and proceeds to step S8.

According to the above processing, in the vocabulary replacement/restoration processing, a special character string W1 such as "+LDMVA+" is used as an alternative term for an unknown word (S21). The special character string W1 is not translated by the translation engine 5, in other words, not changed before and after the machine translation processing in the translation server 42. Therefore, the controller 22 can easily succeed in processing (S25 and S26) as the restoration unit 2b that restores the unknown word in a target language for translation by re-replacing the character string W1 that is the same as the alternative term from the result of the machine translation, and can obtain the translated sentence with high accuracy.

By using the specific character string W1 as an alternative term, it is possible to facilitate to avoid erroneous recognition of the morpheme analysis, e.g., at the time of machine translation processing in the translation server 42 (S23 and S24).

In an exemplary case where the term J21 in the example of FIG. 1 is used as an alternative term, as illustrated in FIG. 9, there is a high possibility that the general morpheme analyzer 5b collectively recognizes, as a single morpheme, a portion in which the same type of characters such as Chinese characters are arranged in the sentence J22 after the replacement with respect to the sentence J10 of the uttered sentence. For this reason, depending on the contents before and after the term J21 in the sentence J22, the morpheme analysis is performed to erroneously separate the inside and outside of the term J21. Thus, it is difficult to avoid a problem that the translated word of the term J21 does not appear in the machine translation result of the sentence J22.

In contrast to this, according to the specific character string W1 used as the alternative term of the present embodiment, it is possible to increase the possibility that the alternative term and its outside are separated in the morpheme analysis by the head and tail symbols "+" of the character string W1. Further, by arranging the same type of characters between the head and tail symbols, the possibility of collectively recognizing the inside of the alternative term can be increased. This can facilitate to avoid erroneous recognition of the morpheme analysis. In this case, the morpheme analyzer 5b of the translation server 42 may not register the character string W1 particularly in a dictionary or the like for the morpheme analysis.

Furthermore, the character string W1 as the alternative term of the present embodiment is set so as not to make sense particularly in a source language for translation such as Japanese. Consequently, it is possible to easily avoid a situation in which the translation server 42 changes the character string to a translated word having a character string different from the character string W1 at the time of machine translation processing. This makes it easy to detect the processing target of the restoration unit 2b in the translation device 1, thereby facilitating to successfully restore the unknown word in the translated sentence.

In the translation server 42, the class of the character string W1 of the alternative term may be registered in the translation dictionary 5a, for example. For example, by using the premise that the character string W1 means "place name", the translation accuracy of the entire sentence J20 including the character string W1 can be improved. Such registration in the translation dictionary 5a can be performed separately from the registration in the morpheme analyzer 5b, and the cost of registration in the translation server 42 can be reduced.

3. Summary

As described above, in the present embodiment, the translation device 1 acquires the input sentence (e.g., an uttered sentence) in the first language (e.g., Japanese), communicates with the translation server 42, and outputs the translated sentence such as the sentence E10 indicating the translation result of the input sentence such as the sentence J10. The translation server 42 is an example of an external device that executes machine translation from the first language to the second language (e.g., English). The translation device 1 includes the memory 20, the controller 22, and the communication interface 18. The memory 20 stores the registered word dictionary 31 that is an example of the first dictionary information, and the alternative word dictionary 32 that is an example of the second dictionary information. The registered word dictionary 31 includes a registered term that is a replacement target term in the first language and a translated word in the second language for the registered term in association with each other. The alternative word dictionary 32 includes at least one alternative term used in place of the replacement target term. The controller 22 replaces the replacement target term included in the input sentence with the alternative term, to generate a replaced sentence indicating a replacement result like the sentence J20 (S21). The communication interface 18 outputs the replaced sentence to the translation server 42 (S23), and acquires a translation result of the replaced sentence in the second language like the sentence E20 from the translation server 42 (S24). The alternative term consists of a specific character string, e.g., the character string W1. The controller 22 detects the specific character string in the translation result of the replaced sentence acquired from the communication interface 18 (S25), and replaces the detected character string with a translated word (e.g., the translated word E11) associated with the registered term (e.g., the term J11) of the replacement target in the registered word dictionary 31, to generates a translated sentence (S26).

According to the translation device 1 described above, by utilizing the fact that the specific character string used as the alternative term is not translated by the translation server 42, the character string is detected in the translation result of the replaced sentence (S25), and the translated sentence is restored (S26). This makes it easy to avoid a failure of restoration as in a case of using the alternative term translated by the translation engine 5 of the translation server 42, and facilitates to appropriately obtain a translated sentence indicating a translation result of the input sentence.

In the present embodiment, the alternative character string used as the alternative term includes the predetermined symbols m0 and m1 arranged at the head and the tail of the character string, respectively, and the character portion w10 of a plurality of characters that are an type with each other and arranged between the head symbol m0 and the tail symbol m1.

According to the alternative character string, there is a relatively high possibility that the character string is not translated by the translation engine 5. Thus, after the processing of the translation engine 5, it facilitates to maintain the same character string as before the processing. For example, by using a character type having a low occurrence frequency in the first language as the alternative character string, the possibility that the character string is not translated can be further increased, and an appropriate translated sentence can be more easily obtained.

In the present embodiment, the replacement target term includes a proper noun, for example. For example, the replacement target term can be set to a term presumed to be an unknown word unregistered in the translation server 4. This makes it possible to obtain a translated sentence with high accuracy even when the input sentence includes the unknown word.

In the present embodiment, the alternative word dictionary 32 may classify alternative terms for each class indicating the type of term. In this case, the controller 22 generates the replaced sentence by using the alternative term classified into an identical class with the replacement target term included in the input sentence (S21). The accuracy of the translated sentence can be improved by the alternative term corresponding to the class.

In the present embodiment, the translation device 1 may further include the microphone 10' that is an example of a voice input interface that inputs an utterance. The communication interface 18 may output the voice data of the utterance to the voice recognition server 41, which is an example of an external voice recognition device, and acquire the input sentence of the recognition result for the voice data from the voice recognition server 41 (S2). According to the translation device 1 described above, it is easy to obtain an appropriate translated sentence for a user's utterance.

Second Embodiment

A second embodiment will be described below using FIGS. 10 to 12. The second embodiment provides a solution different from that of the first embodiment, with respect to the problem described using FIG. 1.

Hereinafter, a description of configurations and operations similar to those of a translation device 1 and a translation system 100 according to the first embodiment will be omitted as appropriate, and a translation device 1 and a translation system 100 according to the present embodiment will be described.

In the present embodiment, a description will be given of the translation device 1 that determines whether or not a translated word of an alternative term is present upon acquiring a machine translation result of a translation engine 5 in vocabulary replacement/restoration processing, and as necessary based on a determination result, repeats the same processing with changing the alternative term.

FIG. 10 illustrates an example of an alternative word dictionary 32A according to the second embodiment. The translation device 1 according to the present embodiment uses, as the alternative term, a term that is presumed to be accurately translated in the translation engine 5, including a word and a phrase, for example.

In the alternative word dictionary 32A of the present embodiment, terms used as alternative terms are described in parallel in a plurality of languages (e.g., Japanese and English) in the same way as a registered word dictionary 31. In the vocabulary replacement/restoration processing according to the present embodiment, a term described in a translation source language among a plurality of languages in the alternative word dictionary 32A is used as the "alternative term" for a replaced sentence, and a term described in a translation target language is used as the "translated word of the alternative term" for a translated sentence.

The alternative word dictionary 32A includes a plurality of alternative terms and translated words thereof in each class, similarly to the first embodiment, for example. Further, the alternative word dictionary 32A of the present embodiment manages the priorities among alternative terms as illustrated in FIG. 10, for example. The priority indicates an order prioritized to be used as an alternative term in the vocabulary replacement/restoration processing of the present embodiment. In this example, the priorities are set among alternative terms of the same class. A term with the priority "1" is an alternative term with the highest priority.

Figure 11:
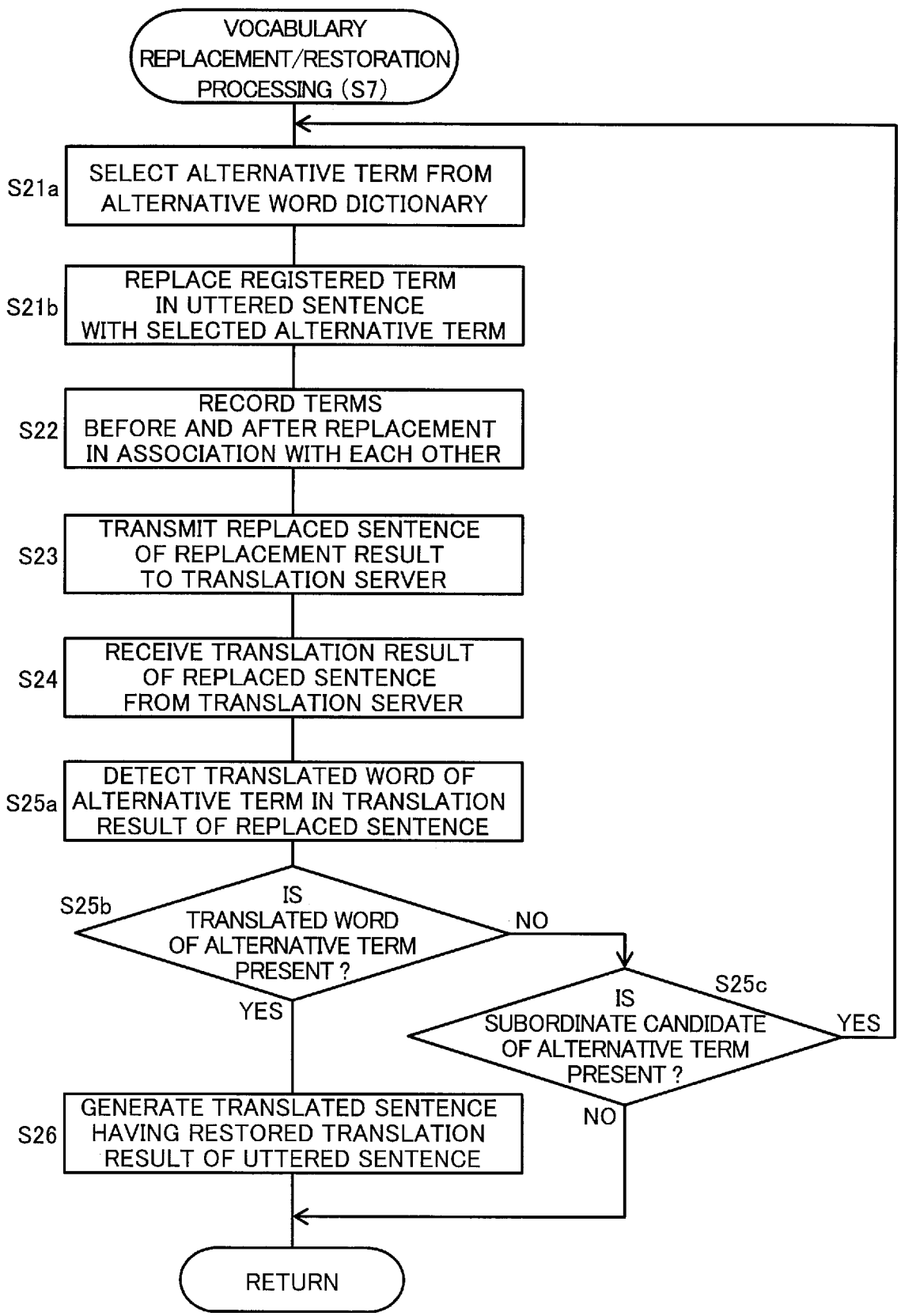
FIG. 11 is a flowchart illustrating vocabulary replacement/restoration processing according to the second embodiment.

FIG. 11 is a flowchart illustrating the vocabulary replacement/restoration processing according to the second embodiment. The translation device 1 according to the present embodiment executes processing illustrated in the present flowchart instead of the flowchart of FIG. 8 in step S7 of FIG. 7, at the time of executing the same operation as the first embodiment.

At first, a controller 22 of the translation device 1 selects one alternative term according to the priority in the alternative word dictionary 32A of the present embodiment (S21a). The controller 22 performs processing as the replacement unit 2a and the restoration unit 2b using the selected alternative term in a manner similar to that of the first embodiment (S21b to S25a). FIG. 12 illustrates an example of replacement information 33A according to the present embodiment.

FIG. 12 illustrates the replacement information 33A in step S22 in a case where a term J23 having the highest priority in the alternative word dictionary 32A of the same class as a term J11 before replacement is selected in step S21a. In this case, the controller 22 replaces the term J11 in the uttered sentence with the selected term J23 to generate a replaced sentence (S21b). For example, alternative terms such as the term J23 are translated from Japanese into English on machine translation processing by the translation server 42.

When a translation result of the replaced sentence is received from the translation server 42 (S24), the controller 22 refers to the replacement information 33A and the alternative word dictionary 32A, and detects a translated word of the alternative term in the sentence of the translation result of the received replaced sentence (S25a). Specifically, the controller 22 reads a translated word E23 of the term J23 after the replacement in the replacement information 33A from the alternative word dictionary 32A, and searches, for the translated word E23, a sentence as a result of the machine translation.

In the case described above, a case where the translated word E23 of the preset alternative term is not included in the sentence of the translation result of the replaced sentence in the translation server 42 is considered. The controller 22 determines whether or not a translated word of the alternative term is present in the sentence of the translation result of the replaced sentence received from the translation server 42, on the basis of the detection result in step S25a (S25b).

When it is determined that the translated word of the alternative term is not present in the translation result of the replaced sentence (NO in S25b), the controller 22, referring to the alternative word dictionary 32A, determines whether or not a subordinate candidate of the alternative term is present (S25c). The subordinate candidate of the alternative term is an alternative term having a priority lower than the priority of the alternative term used for the replaced sentence within the same class as the used alternative term in the alternative word dictionary 32A.

When the subordinate candidate of the alternative term is present (YES in S25c), the controller 22 selects an alternative term having the highest priority among subordinate candidates of the alternative term (S21a), and performs the processing of step S21b and subsequent steps again. As a result, a replaced sentence is repeatedly generated using the alternative term in descending order, and is transmitted to the translation server 42 (S23). The translation engine 5 sequentially executes machine translation of the received replaced sentence.

When it is determined that the translated word of the alternative term is present in the translation result of the replaced sentence (YES in S25b), the controller 22 replaces the translated word of the alternative term with the translated word of the registered term, and generates a translated sentence, similarly to the first embodiment (S26). Then, the controller 22 ends step S7 in FIG. 7 and proceeds to step S8.

According to the above processing, upon generating the replaced sentence including the alternative term, when a preset translated word for the alternative term is not included in the translation result of the replaced sentence by the translation engine 5 (NO in S25b), a replaced sentence is generated again using another alternative term (S21a to S24). When the translated word of the preset alternative term is included in any one of the results of the machine translation for a plurality of replaced sentences by different alternative terms (YES in S25b), a translated sentence in which an unknown word has been restored can be obtained (S26). Further, even when the restoration of the unknown word fails, it facilitates to avoid a situation in which the user could see a sentence including a translated word similar to the translated word E23 of the alternative term instead of the unknown word. As such, the accuracy of the translated sentence can be improved.

When the determination that the translated word of the alternative term is not present in the translation result of the replaced sentence (NO in S25b) is repeated to use up subordinate candidates for the alternative term (NO in S25c), the controller 22 ends step S7 in FIG. 7 without performing the processing of step S26, for example.

In the above case, subsequently to step S8, the controller 22 may cause a display 14 to display a translation result of the finally received replaced sentence as a translated sentence. For example, an alternative term having the lowest priority in the alternative word dictionary 32A is in advance registered as a term that is considered not to cause a discomfort of a user such as a host even if a translation result is displayed. Consequently, even if the sentence in which the restoration of the unknown word has failed is finally displayed, it is possible to reduce the discomfort, of the user. Alternatively or additionally to the display of the translated sentence, the controller 22 may display various error displays.

As described above, in the present embodiment, the translation device 1 acquires an input sentence in the first language, communicates with the translation server 42 or the like that executes machine translation from the first language to the second language, and outputs a translated sentence indicating a translation result of the input sentence. The translation device 1 includes the memory 20, the controller 22, and the communication interface 18. The memory 20 stores the registered word dictionary 31 that is an example of the first dictionary information and the alternative word dictionary 32A that is an example of the second dictionary information. The alternative word dictionary 32A of the present embodiment includes a plurality of alternative terms each used instead of the replacement target term in the first language and translated words in the second language for the alternative terms in association with each other. The controller 22 determines whether or not a translated word of an alternative term is present in the translation result of the replaced sentence acquired from the communication interface 18 (S25b). When it is determined that there the translated word of the alternative term is not present (NO in S25b), the controller 22 renews the replaced sentence using an alternative term different from the alternative term associated with the translated word in the alternative word dictionary 32A, and causes the communication interface 18 to output the renewed replaced sentence (S25c to S23). When it is determined that the translated word of the alternative term is present (YES in S25b), the controller 22 replaces the translated word with a translated word associated with a replacement target term in the registered word dictionary 31, to generate a translated sentence (S26).

According to the translation device 1 described above, when there is no translated word of the alternative term in the alternative word dictionary 32A in the translation result of the replaced sentence including the alternative term (NO in S25b), machine translation of the replaced sentence is performed again using another alternative term. As such, by using a plurality of replaced sentences, it is possible to reduce the possibility that the restoration of the translated sentence will finally fail as compared with a case where only one replaced sentence is used, facilitating to appropriately obtain the translated sentence indicating the translation result of the input sentence. Further, it is possible to easily avoid a situation in which the sentence in which the restoration of the unknown word has failed is seen by the user.

In the present embodiment, the alternative word dictionary 32A may manage the priorities of a plurality of alternative terms. The controller 22 uses the plurality of alternative terms in descending order in the replaced sentence (S21a). For example, by setting the priorities of alternative terms having a high possibility of including the translated word in the translation result of the replaced sentence to be high, it is possible to efficiently succeed in restoring the translated sentence.

Other Embodiments

As described above, the first and second embodiments have been described as examples of the technology disclosed in the present application. However, the technology in the present disclosure is not limited thereto, and can also be applied to embodiments in which changes, replacements, additions, omissions, and the like are made as appropriate. In addition, it is possible to combine the components described in the above embodiments to implement a new embodiment. Therefore, other embodiments will be illustrated below.

In the vocabulary replacement/restoration processing (FIG. 11) according to the second embodiment, the specific character string according to the first embodiment may be used. Such a modification will be described using FIG. 13.

FIG. 13 illustrates an alternative word dictionary 32B according to the present modification. For example, in the alternative word dictionary 32B similar to that of the second embodiment, the alternative character string of the first embodiment may be registered. In the example of FIG. 13, the character string W1 is included in the alternative word dictionary 32B as an alternative term. In the alternative word dictionary 32B of this example, the same character string W1 is described in each language such as Japanese and English.

According to the alternative word dictionary 32B, the controller 22 uses the character string W1 as an alternative term with reference to the description in the source language for translation such as Japanese in step S21b of FIG. 11, for example. Further, in step S25a, the same character string W1 is used as a translated word of the alternative term with reference to the description in the target language for translation such as English. As such, the vocabulary replacement/restoration processing can be performed using the special character string W1 and other alternative terms in a similar manner.

As described above, in the present modification, a plurality of alternative terms in the alternative word dictionary 32B may include the alternative term consisting of the specific character string. The alternative word dictionary 32B may include, as the translated word of the alternative term consisting of the specific character string, the identical character string with the character string.

The vocabulary replacement/restoration processing similar to that of the second embodiment may be performed using the alternative word dictionary 32 of the first embodiment. For example, in the alternative word dictionary 32 of FIG. 5, the priorities among the alternative character strings can be set in ascending order registered for each class.

According to the alternative word dictionary 32, at the time of processing similar to that in FIG. 11, the controller 22 detects the presence or absence of the alternative character string instead of the translated word of the alternative term in steps S25a and S25b, similarly to step S25 in FIG. 8. Then, when it is detected that there is no alternative character string (NO in S25b), the generation of the replaced sentence is repeated using another alternative character string including a different character string (S21a to S25c). Thus, the accuracy of the translated sentence can be improved.

As described above, in the present modification, the alternative word dictionary 32 may include a plurality of alternative terms each consisting of a different character strings from each other. When it is detected that the character string used for the replaced sentence is not present in the translation result of the replaced sentence acquired from the communication interface 18 (NO in S25b), the controller 22 may renew the replaced sentence using an alternative term different from the alternative term of the character string and output the renewed replaced sentence to the communication interface 18 (S25c to S23).

The translation device 1 according to the above embodiments may further have a reverse translation function of translating, into an original language (e.g., Japanese), a translated sentence that is a translation result obtained by translating an utterance language (e.g., Japanese) into another language (e.g., English). In this case, the translation device 1 transmits the translated sentence in the replaced state to the translation server 42, and acquires a reverse translated sentence from the translation server 4.

In the above embodiments, voice recognition is performed by the voice recognition server 41, translation is performed by the translation server 42, and voice synthesis is performed by the voice synthesis server 5. However, the present disclosure is not limited thereto. Processing of at least one of the voice recognition, the translation, and the voice synthesis may be performed in the translation device 1. For example, the translation device 1 (terminal) may be equipped with all of the same functions as the voice recognition server 41, the translation server 42, and the voice synthesis server 43, and all of the processing related to the translation may be performed only by the translation device 1. In this case, the translation device 1 may not include the communication interface 18 connected to the communication network 4. For example, in the controller 22, a function of exchanging information with the translation engine 5, which is a function of the translation server 42, may configure a communication interface for the translation engine 5.

In the above embodiments, an example of translation between Japanese and English has been described. However, the translation processing target languages are not limited to Japanese and English, and may be other languages, e.g., Chinese, German, French, Spanish, Korean, Thai, Vietnamese, Indonesian, and the like.

In the above embodiments, the translation device 1 translates the uttered sentence input using the microphone 10 as the input sentence. However, the translation device 1 may translate an input sentence input in a manner other than utterance. For example, the translation device 1 may translate an input sentence input by a keyboard, a mouse, or the like. That is, when sentences of various input sentences are translated, the translation device 1 of the present disclosure replaces a replacement target term in the sentences with an alternative term and performs translation. Then, a translated word of the alternative term included in the translated sentence is restored to a translated word for the replacement target term replaced with the alternative term, and the translated sentence is displayed.

As described above, the embodiments have been described as examples of the technology in the present disclosure. For this purpose, the accompanying drawings and the detailed description have been provided.

Therefore, the components described in the accompanying drawings and the detailed description may include not only components that are essential for solving the problem but also components that are not essential for solving the problem in order to illustrate the above technology. Therefore, it should not be immediately recognized that these non-essential components are essential, on the basis of the fact that these non-essential components are described in the accompanying drawings and the detailed description.

In addition, since the above-described embodiments are intended to illustrate the technology in the present disclosure, various changes, replacements, additions, omissions, and the like can be made within the scope of the claims or equivalents thereof.

The present disclosure is applicable to a translation device for performing translation between various languages in various scenes.

The invention claimed is:

1. A translation device that acquires an input sentence in a first language, communicates with an external device executing machine translation from the first language into a second language, and outputs a translated sentence indicating a translation result of the input sentence, the translation device comprising:
a memory that stores first dictionary information and second dictionary information, the first dictionary information including a replacement target term in the first language and a translated word in the second language for the replacement target term in association with each other, and the second dictionary information including a plurality of alternative terms which are character strings different from each other and each used instead of the replacement target term;
a controller that replaces the replacement target term included in the input sentence with the alternative term to generate a replaced sentence indicating a replacement result; and
a communication interface that outputs the replaced sentence to the external device and acquires a translation result of the replaced sentence in the second language from the external device, wherein
an alternative term in the plurality of alternative terms consists of a specific character string, and
the controller
detects the specific character string in the translation result of the replaced sentence acquired from the communication interface, and
replaces the detected character string with a translated word associated with the replacement target term in the first dictionary information, to generate the translated sentence, wherein
when the controller detects that the translation result of the replaced sentence acquired from the communication interface does not include a character string used in the replaced sentence, the controller renews the replaced sentence using a different alternative term from an alternative term of the used character string and causes the communication interface to output the renewed replaced sentence.

2. The translation device according to claim 1, wherein the specific character string includes predetermined symbols arranged at a head and a tail of the character string, and a plurality of characters that are an identical type with each other and arranged between the head symbol and the tail symbol.

3. The translation device according to claim 1, wherein the second dictionary information manages priorities of the plurality of alternative terms, and
the controller uses the plurality of alternative terms in descending order of the priorities in the replaced sentence.

4. The translation device according to claim 1, wherein the replacement target term includes a proper noun.

5. The translation device according to claim 1, wherein the second dictionary information classifies the alternative term for each class indicating a type of term, and
the controller generates the replaced sentence by using an alternative term classified into an identical class with the replacement target term included in the input sentence.

6. The translation device according to claim 1, further comprising:
a voice input interface that inputs an utterance, wherein
the communication interface outputs voice data of the utterance to an external voice recognition device and acquires the input sentence for the voice data from the external voice recognition device.

7. A translation device that acquires an input sentence in a first language, communicates with an external device executing machine translation from the first language into a second language, and outputs a translated sentence indicating a translation result of the input sentence, the translation device comprising:
a memory that stores first dictionary information and second dictionary information, the first dictionary information including a replacement target term in the first language and a translated word in the second language for the replacement target term in association with each other, and the second dictionary information including a plurality of alternative terms each used instead of the replacement target term in the first language and translated words in the second language for the alternative terms in association with each other;
a controller that replaces the replacement target term included in the input sentence with the alternative term to generate a replaced sentence indicating a replacement result; and
a communication interface that outputs the replaced sentence to the external device and acquires a translation result of the replaced sentence in the second language from the external device, wherein
the controller determines whether a translated word of the alternative term is present in the translation result of the replaced sentence acquired from the communication interface,
when it is determined that the translated word of the alternative term is not present, the controller renews the replaced sentence using a different alternative term from the alternative term associated with the translated word in the second dictionary information and causes the communication interface to output the renewed replaced sentence, and
when it is determined that the translated word of the alternative term is present, the controller replaces the translated word with a translated word associated with the replacement target term in the first dictionary information to generate the translated sentence.

8. The translation device according to claim 7, wherein
the plurality of alternative terms include an alternative term consisting of a specific character string, and
the second dictionary information includes an identical character string with the specific character string as a translated word of the alternative term consisting of the specific character string.

9. The translation device according to claim 7, wherein
the second dictionary information manages priorities of the plurality of alternative terms, and
the controller uses the plurality of alternative terms in descending order of the priorities in the replaced sentence.

10. The translation device according to claim 7, wherein the replacement target term includes a proper noun.

11. The translation device according to claim 7, wherein
the second dictionary information classifies the alternative term for each class indicating a type of term, and
the controller generates the replaced sentence by using an alternative term classified into an identical class with the replacement target term included in the input sentence.

12. The translation device according to claim 7, further comprising:
a voice input interface that inputs an utterance, wherein
the communication interface outputs voice data of the utterance to an external voice recognition device and acquires the input sentence for the voice data from the external voice recognition device.

* * * * *